(12) United States Patent
Hachisuga et al.

(10) Patent No.: US 10,805,492 B2
(45) Date of Patent: Oct. 13, 2020

(54) IMAGE READING DEVICE

(71) Applicant: FUJI XEROX CO., LTD., Tokyo (JP)

(72) Inventors: Masaki Hachisuga, Kanagawa (JP); Shota Funaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 32 days.

(21) Appl. No.: 16/273,171

(22) Filed: Feb. 12, 2019

(65) Prior Publication Data

US 2020/0045195 A1 Feb. 6, 2020

(30) Foreign Application Priority Data

Aug. 1, 2018 (JP) .................................. 2018-144767

(51) Int. Cl.
*H04N 1/00* (2006.01)
*H04N 1/053* (2006.01)

(52) U.S. Cl.
CPC ..... *H04N 1/00795* (2013.01); *H04N 1/00615* (2013.01); *H04N 1/053* (2013.01); *H04N 2201/0081* (2013.01); *H04N 2201/04743* (2013.01)

(58) Field of Classification Search
CPC ........... H04N 1/00795; H04N 1/00615; H04N 1/053; H04N 2201/04743; H04N 2201/0081
See application file for complete search history.

(56) References Cited

U.S. PATENT DOCUMENTS

| | | | | |
|---|---|---|---|---|
| 5,719,404 A | * | 2/1998 | Tsai .................... | H04N 1/053 250/559.29 |
| 2010/0277776 A1 | * | 11/2010 | Osakabe ................ | H04N 1/047 358/498 |
| 2011/0122455 A1 | * | 5/2011 | Elliot .................. | H04N 1/00063 358/406 |
| 2017/0064127 A1 | * | 3/2017 | Tagawa .................. | H04N 1/193 |
| 2017/0104888 A1 | * | 4/2017 | Nomura ............. | H04N 1/00795 |
| 2018/0069976 A1 | * | 3/2018 | Yamada ............. | H04N 1/00753 |

FOREIGN PATENT DOCUMENTS

| | | | |
|---|---|---|---|
| JP | 09284479 A | * | 10/1997 |
| JP | H09-284479 | | 10/1997 |
| JP | H11-355513 | | 12/1999 |

* cited by examiner

*Primary Examiner* — Neil R McLean
(74) *Attorney, Agent, or Firm* — JCIPRNET

(57) ABSTRACT

An image reading device includes at least one reference portion that is provided in a reading area of a reading unit provided with a moving mechanism, a memory unit that stores, as an initial value, positional data of the reference portion that is read by the reading unit, an acquisition unit that reads the positional data of the reference portion and acquires a displacement amount of the read positional data from the initial value, and an error handling unit that performs error handling when the displacement amount exceeds a predetermined value.

9 Claims, 16 Drawing Sheets

FIG. 15

$$\left\{\begin{array}{l}\text{POSITION A POSITION 1 CORRECTION AMOUNT} \overbrace{\underbrace{(11*-1*)}_{Z}-\underbrace{\{(11*-1*)-(11-1)\}\times XA/X1}_{G}}^{HZ}\\ \\ \text{POSITION A POSITION 2 CORRECTION AMOUNT}\\ \qquad\qquad (12*-2*)-\{(12*-2*)-(12-2)\}\times XA/X1\\ \qquad\qquad\vdots\\ \text{POSITION B POSITION 1 CORRECTION AMOUNT}\\ \qquad\qquad (11*-1*)-\{(11*-1*)-(11-1)\}\times XB/X1\\ \qquad\qquad\vdots\\ \text{POSITION C POSITION 1 CORRECTION AMOUNT}\\ \qquad\qquad (11*-1*)-\{(11*-1*)-(11-1)\}\times XC/X1\end{array}\right.$$

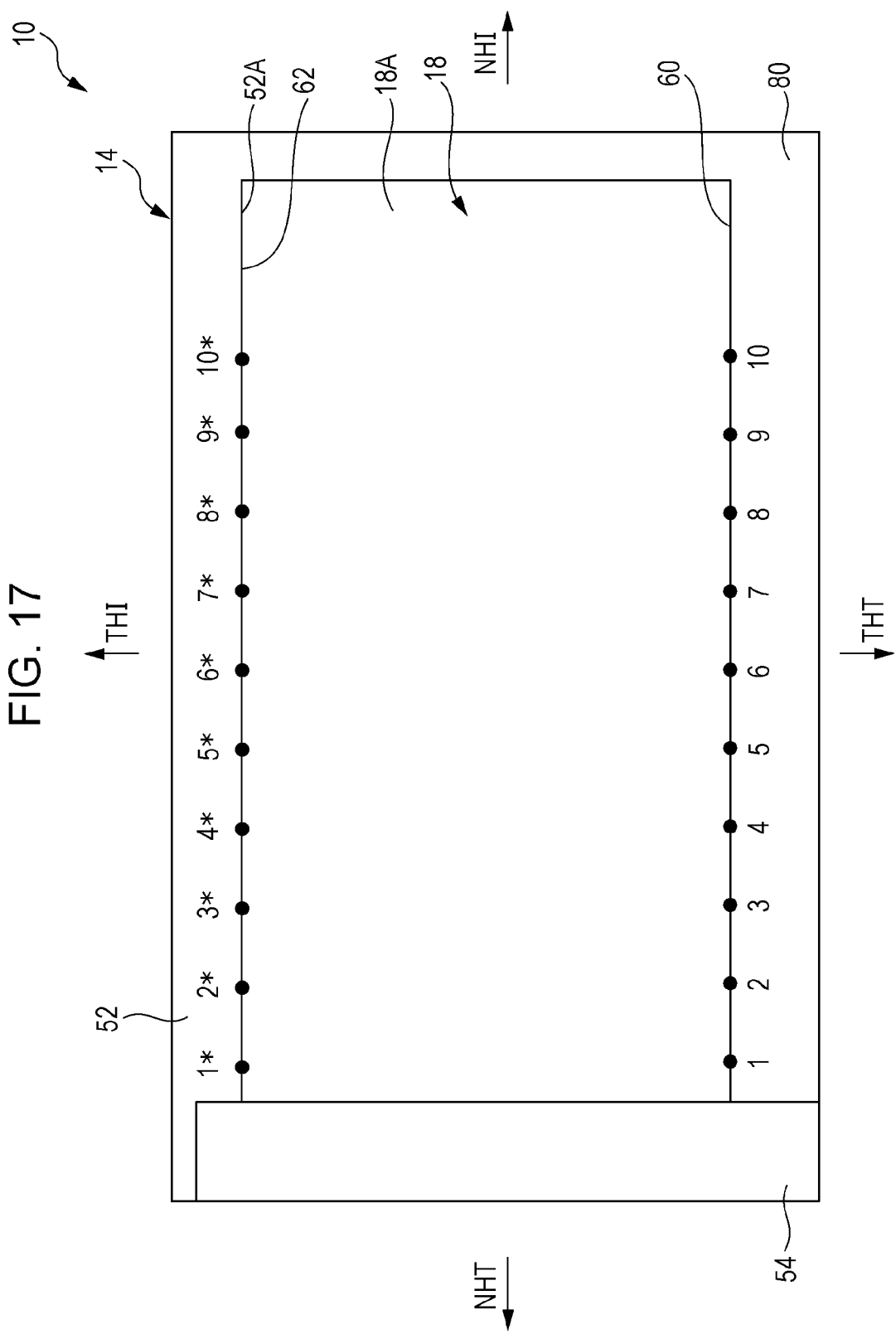

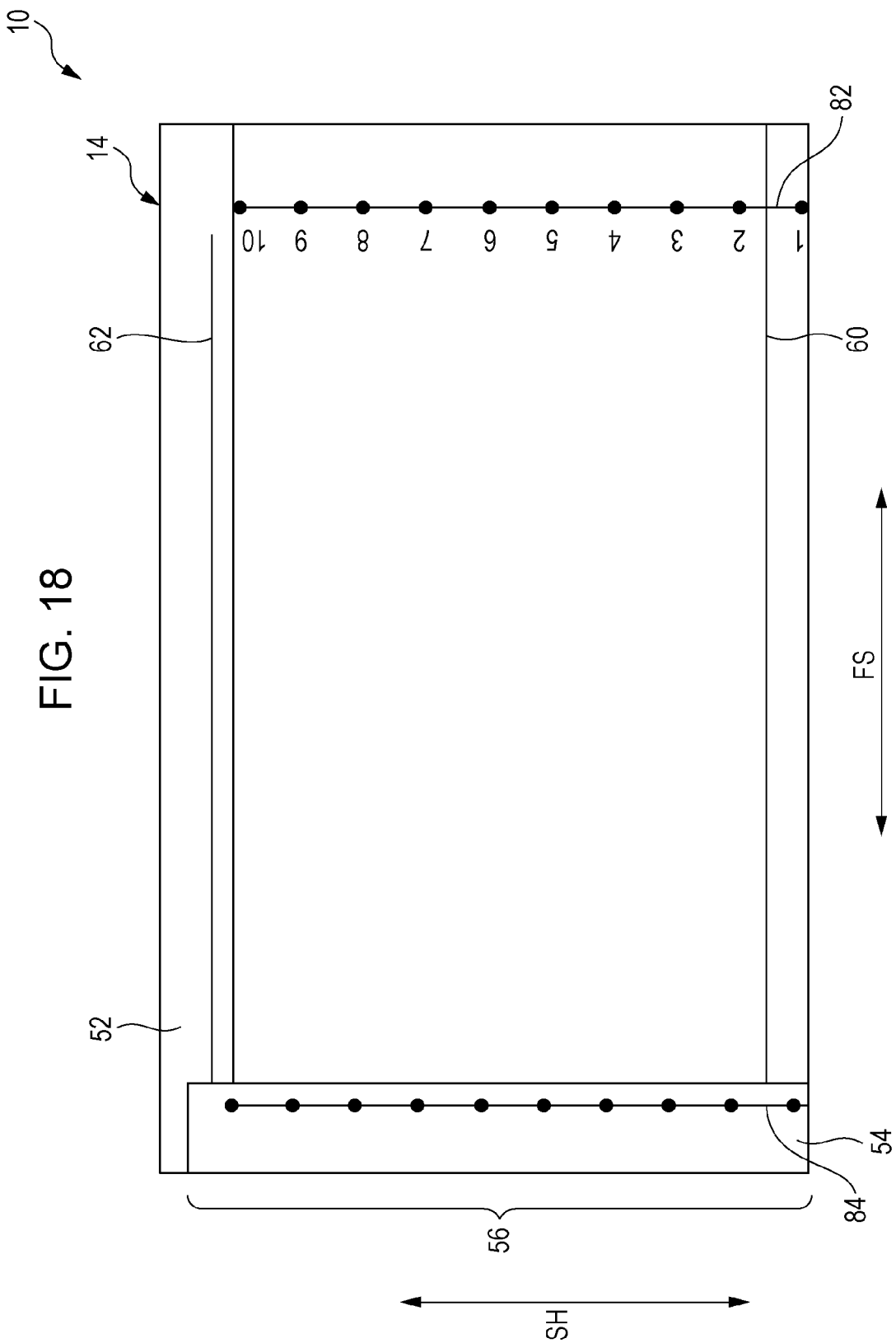

IMAGE READING DEVICE

CROSS-REFERENCE TO RELATED APPLICATIONS

This application is based on and claims priority under 35 USC 119 from Japanese Patent Application No. 2018-144767 filed Aug. 1, 2018.

BACKGROUND

(i) Technical Field

The present disclosure relates to an image reading device.

(ii) Related Art

An image reading device described in Japanese Unexamined Patent Application Publication No. 11-355513 includes a main-scanning-direction reference mark that is formed in a physical-length pattern, which functions as a reference in a main scanning direction at a position that is on the same plane as an image reading surface of a document table and that is outside of an effective image region. The main-scanning-direction reference mark provides information related to a reading magnification by being read by a solid-state imaging device. The image reading device calculates a reading magnification in the actual main scanning direction on the basis of a predetermined length X of the main-scanning-direction reference mark and length information Y that is acquired as a result of the solid-state imaging device reading the main-scanning-direction reference mark. The image reading device automatically corrects, in accordance with the calculation result, the reading magnification at which a document is read in the main scanning direction.

In an image reading device described in Japanese Unexamined Patent Application Publication No. 9-284479, two straight lines each having a thickness of 0.3 mm are provided directly behind a white reference plate for shading correction in such a manner as to be parallel to each other in a subscanning direction. The ratio of the distance between the marks stored in memory at the time of performing a first scan operation to the distance between the marks stored in the memory at the time of performing a second scan operation is equal to a value obtained by multiplying a magnification error caused by a printer and a magnification error caused by a scanner. The image reading device performs magnification adjustment on the basis of this value.

SUMMARY

Aspects of non-limiting embodiments of the present disclosure relate to suppressing acquisition of an image that is distorted due to deformation of a device compared with a case where an image is acquired without using positional data of a reference portion when the image is read.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image reading device including at least one reference portion that is provided in a reading area of a reading unit provided with a moving mechanism, a memory unit that stores, as an initial value, positional data of the reference portion that is read by the reading unit, an acquisition unit that reads the positional data of the reference portion and acquires a displacement amount of the read positional data from the initial value, and an error handling unit that performs error handling when the displacement amount exceeds a predetermined value.

BRIEF DESCRIPTION OF THE DRAWINGS

Exemplary embodiments of the present disclosure will be described in detail based on the following figures, wherein:

FIG. 15 is a diagram illustrating an operation of the image reading device according to the second exemplary embodiment by an arithmetic expression;

FIG. 17 is a diagram illustrating a top surface of an image reading device according to a third exemplary embodiment; and FIG. 18 is a diagram illustrating a top surface of an image reading device according to a fourth exemplary embodiment.

DETAILED DESCRIPTION

First Exemplary Embodiment

An image reading device 10 according to a first exemplary embodiment will be described below with reference to the drawings.

The image reading device 10 includes an image reading processing unit 14 that reads an image formed on a surface of a reading target 12 and a covering 16 that covers a top surface of the image reading processing unit 14. A rear edge of the covering 16 is supported on the image reading processing unit 14 via a hinge (not illustrated), and the covering 16 is configured to be in a state of covering the top surface of the image reading processing unit 14 or in a state of exposing the top surface.

Figure 2:
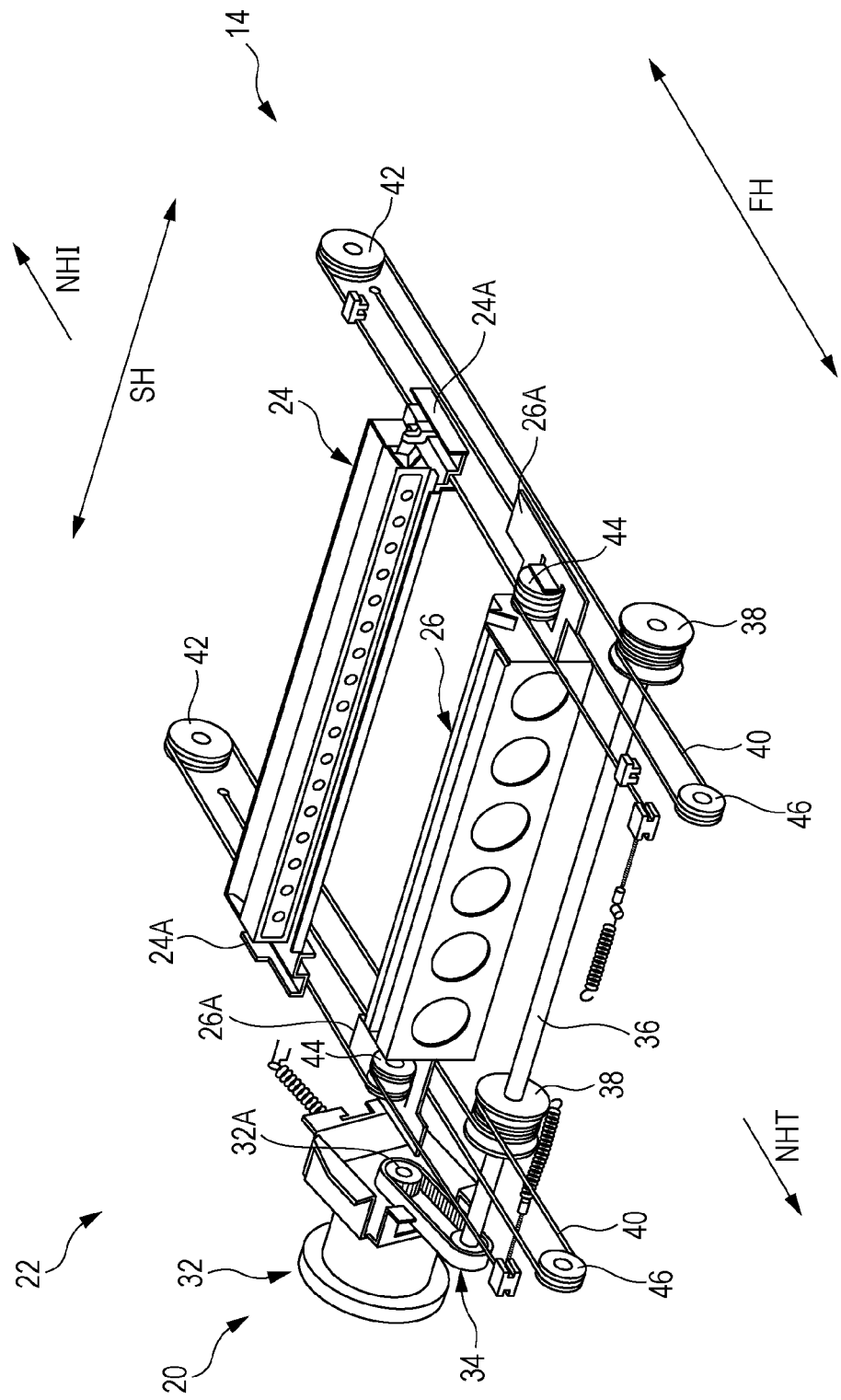
FIG. 2 is a perspective view illustrating a reading unit of the image reading device according to the first exemplary embodiment.

The image reading processing unit 14 has a function of reading a surface of a document that is the reading target 12 placed on a platen glass 18. As illustrated in FIG. 2, a reading unit 22 that includes a moving mechanism 20 is disposed in in a housing 14A of the image reading processing unit 14.

Figure 1:
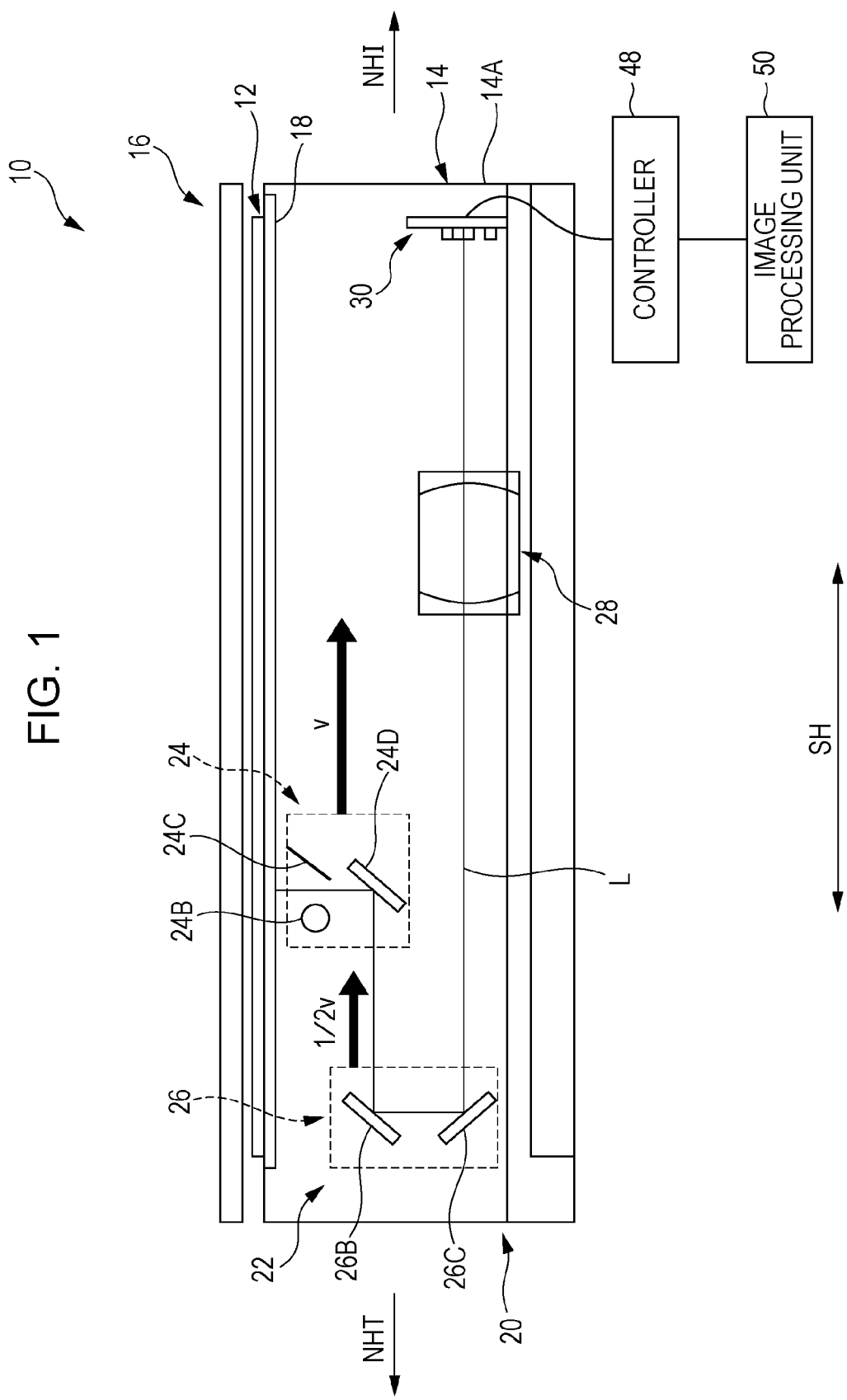
FIG. 1 a schematic diagram illustrating a configuration of an image reading device according to a first exemplary embodiment.

As illustrated in FIG. 1, the reading unit 22 includes a full-rate carriage 24 that captures image information by using light while moving along a longitudinal direction, which is a reading direction in which the image reading processing unit 14 reads the reading target 12 and a half-rate carriage 26 that changes an optical path L from the full-rate carriage 24. The reading unit 22 further includes an imaging lens 28 through which light passes after the optical path L has been changed by the half-rate carriage 26 and a charge coupled device (CCD) image sensor 30 that receives the light that has passed through the imaging lens 28.

As illustrated in FIG. 2, the moving mechanism 20 of the reading unit 22 includes a drive motor 32 and a drive shaft 36 that is coupled to an output shaft 32A of the drive motor 32 via a belt 34. The drive shaft 36 extends in a transverse direction that is a direction crossing the reading direction, in which the image reading processing unit 14 reads the reading target 12, and drive pulleys 38 are provided at the end portions of the drive shaft 36.

Drive wires 40 are wound around the drive pulleys 38. Each of the drive wires 40 extending toward a first side NHI in the longitudinal direction is bent toward a corresponding one of the drive pulleys 38 via one of first-side fixed pulleys 42 each of which is supported on the housing 14A via a rotary shaft. The drive wires 40 bent by their respective first-side fixed pulleys 42 are bent by drive pulleys 44, and ends of the drive wires 40 bent by their respective drive pulleys 44 are fixed to the housing 14A.

Note that the drive wires 40 extending from their respective drive pulley 38 toward a second side NHT in the longitudinal direction are bent by second-side fixed pulleys 46 and then wound around their respective drive pulleys 44.

Brackets 24A that extend from end portions of the full-rate carriage 24 are each fixed to a portion of one of the drive wires 40, the portion being located between one of the first-side fixed pulleys 42 and a corresponding one of the drive pulleys 44. In addition, each of the drive pulleys 44 is rotatably supported by one of support plates 26A that extend from the end portions of the half-rate carriage 26.

As a result, each of the carriages 24 and 26 is caused to move in the longitudinal direction by the drive wires 40 while being supported by the drive wires 40. In addition, the moving speed of the half-rate carriage 26 is one-half of the moving speed of the full-rate carriage 24.

As illustrated in FIG. 1, the full-rate carriage 24 includes an illumination unit 24B provided with a light source that radiates light onto the reading target 12 and a diffuse-reflecting member 24C that reflects the light emitted by the illumination unit 24B while diffusing the light toward the reading target 12. The full-rate carriage 24 further includes a first mirror 24D that reflects light that is reflected by the reading target 12 toward the half-rate carriage 26.

The half-rate carriage 26 includes a second mirror 26B and a third mirror 26C that guide light obtained from the full-rate carriage 24 to the CCD image sensor 30 via the imaging lens 28. As a result, the CCD image sensor 30 forms an image by using image information acquired by the full-rate carriage 24, and the formed image is obtained as image data.

The illumination unit 24B, the diffuse-reflecting member 24C, and the first mirror 24D of the full-rate carriage 24 extend in the transverse direction of the image reading processing unit 14. In addition, the second mirror 26B and the third mirror 26C of the half-rate carriage 26, the imaging lens 28, and the CCD image sensor 30 extend in the transverse direction of the image reading processing unit 14. Accordingly, the CCD image sensor 30 acquires image information of the reading target 12 in the transverse direction, and the transverse direction will be referred to as a main scanning direction SH.

As illustrated in FIG. 2, the full-rate carriage 24 and the half-rate carriage 26 are caused to move in the longitudinal direction of the image reading processing unit 14 by the moving mechanism 20, so that the image information of the reading target 12 in the longitudinal direction is acquired. The longitudinal direction will be referred to as a subscanning direction FH, and the subscanning direction FH crosses the main scanning direction SH.

As illustrated in FIG. 1, the reading unit 22 includes a controller 48 that controls the operation of the reading unit 22 and an image processing unit 50 that processes image data acquired by the CCD image sensor 30. The controller 48 controls the drive motor 32 of the moving mechanism 20, the illumination unit 24B, and so forth, and the image processing unit 50 forms image data by using data from the CCD image sensor 30 and processes the image data.

Figure 3:
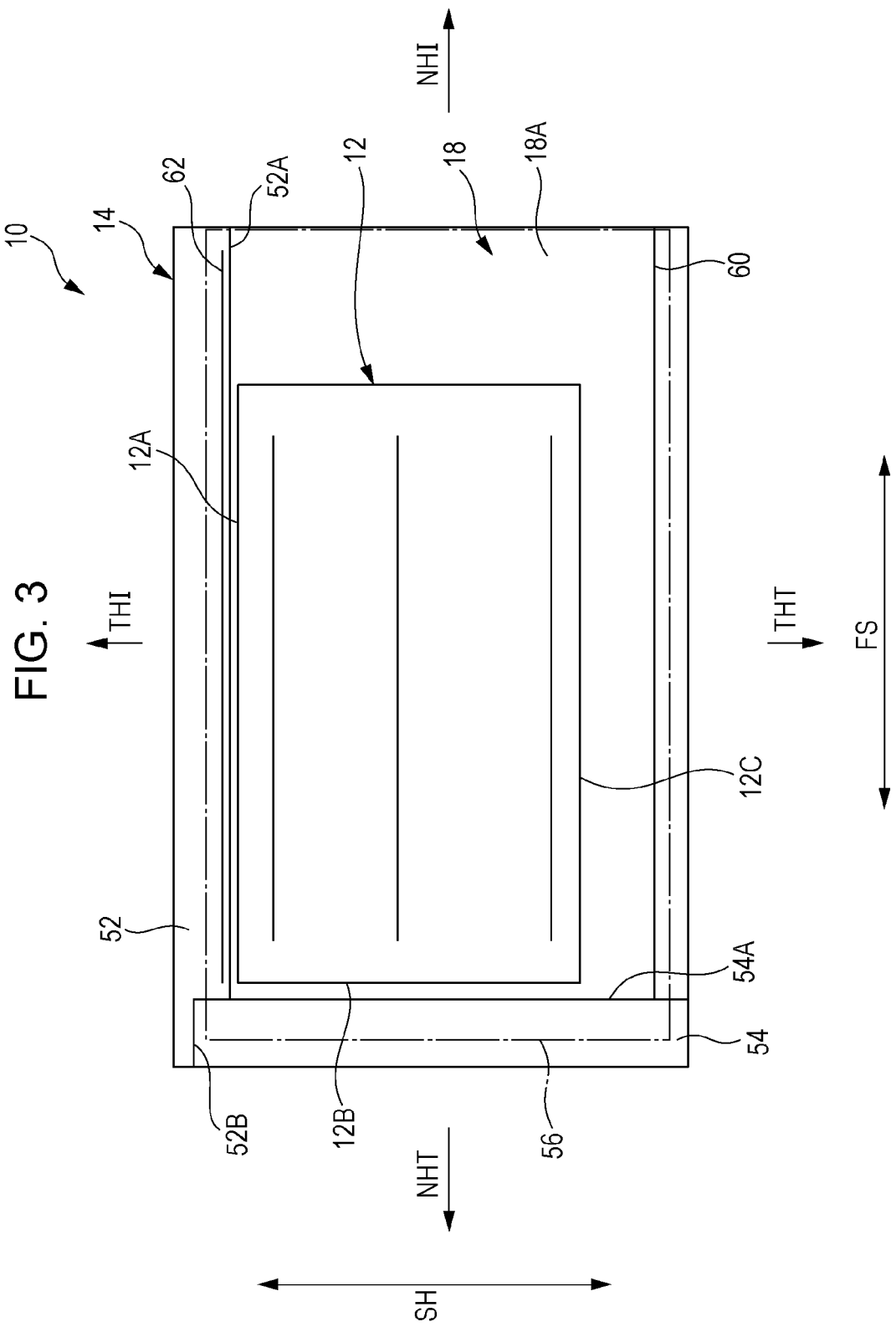
FIG. 3 is a diagram illustrating a top surface of the image reading device according to the first exemplary embodiment.

FIG. 3 is a diagram illustrating the top surface of the image reading processing unit 14 in the image reading device 10 and illustrates a state in which the covering 16 has been removed from the image reading processing unit 14.

The top surface of the image reading processing unit 14 is formed in a rectangular shape and is provided with the platen glass 18 that has a rectangular shape. As illustrated in FIG. 2, the reading unit 22 is disposed below the platen glass 18, and the carriages 24 and 26 of the reading unit 22 extend in the transverse direction, which is the main scanning direction SH. In addition, each of the carriages 24 and 26 moves in the longitudinal direction, which is the subscanning direction FH.

An opaque main-scanning-direction abutting portion 52 is disposed on the platen glass 18 on a first side THI in the transverse direction. The main-scanning-direction abutting portion 52 is formed of a plate-shaped member extending in the longitudinal direction of the image reading processing unit 14 (the subscanning direction FH), and the main-scanning-direction abutting portion 52 is formed so as to have a thickness larger than that of the platen glass 18.

An edge 52A of the main-scanning-direction abutting portion 52 that is located on the side of the platen glass 18 protrudes upward further than a glass surface 18A of the platen glass 18 does. A document, which is the reading target 12, is positioned by causing a first side 12A of the document to abut against the edge 52A of the main-scanning-direction abutting portion 52, so that the reading target 12 may be arranged at a predetermined position in the main scanning direction SH.

An opaque subscanning-direction abutting portion 54 is disposed on the platen glass 18 on the second side NHT in the longitudinal direction. The subscanning-direction abutting portion 54 is formed of a plate-shaped member extending in the transverse direction of the image reading processing unit 14 (the main scanning direction SH), and the subscanning-direction abutting portion 54 is formed so as to have a thickness larger than that of the platen glass 18.

An edge 54A of the subscanning-direction abutting portion 54 that is located on the side of the platen glass 18 protrudes upward further than the glass surface 18A of the platen glass 18 does. The document, which is the reading target 12, is positioned by causing a second side 12B of the document to abut against the edge 54A of the subscanning-direction abutting portion 54, so that the reading target 12 may be arranged at a predetermined position in the subscanning direction FH.

An end portion of the subscanning-direction abutting portion 54 is positioned in a state of being located in a cutout portion 52B that is formed in an end portion of the main-scanning-direction abutting portion 52, and the edge 52A of the main-scanning-direction abutting portion 52 and the edge 54A of the subscanning-direction abutting portion 54 intersect each other at right angles. Here, the term "at right angles" includes angles within a manufacturing error range.

Note that, in the drawings including FIG. 3 that illustrates the reading target 12, a state in which the sides 12A and 12B of the reading target 12 are respectively separated from the abutting portions 52 and 54 is illustrated for convenience of description.

In the image reading device 10, a reference portion is provided in a reading area 56 of the reading unit 22. The reference portion includes a first main reference line 60 that is provided on a first side in the main scanning direction SH of the reading unit 22 (a second side THT in the transverse direction) and that forms a first reference portion and a second main reference line 62 that is provided on a second side in the main scanning direction SH of the reading unit 22 (the first side THI in the transverse direction) and that forms a second reference portion. Each of the main reference lines 60 and 62 is formed of a straight line, and the main reference lines 60 and 62 are parallel to each other. Here, the term "parallel" includes inclinations within a manufacturing error range.

In the first exemplary embodiment, although the case in which the first main reference line 60 and the second main reference line 62 are each formed of a straight line is described, the present disclosure is not limited to this case. Each of the first main reference line 60 and the second main reference line 62 may be formed of a curved line, a bent line, or a dashed line.

In addition, although the case in which the first main reference line 60 and the second main reference line 62 are parallel to each other is described as an example, the present disclosure is not limited to this case, and the first main reference line 60 and the second main reference line 62 are not necessarily parallel to each other.

The first main reference line 60 is provided on the glass surface 18A of the platen glass 18 on which the reading target 12 is to be placed. In general, deformation is relatively less likely to occur in a platen glass than in a housing of a device or a moving mechanism, and thus, the first main reference line 60 is provided on the glass surface 18A of the platen glass 18. The first main reference line 60 may be formed by, for example, printing and may be provided on the front surface of the platen glass 18 that forms a portion of the platen glass 18 on the side of the covering 16 or on the rear surface of the platen glass 18 that forms a portion of the platen glass 18 on the side of the reading unit 22. In the first exemplary embodiment, a case in which the first main reference line 60 is provided on the rear surface of the platen glass 18 from the standpoint of protection of the first main reference line 60 will be described as an example.

The second main reference line 62 is provided on the rear surface of the main-scanning-direction abutting portion 52 against which the document, which is the reading target 12, is caused to abut so as to be positioned, the rear surface being located on the side of the reading unit 22, and the second main reference line 62 may be formed by, for example, printing.

Note that, although FIG. 3 illustrates a case in which the second main reference line 62 is provided on the front surface of the main-scanning-direction abutting portion 52 for convenience of describing the position of the second main reference line 62, the second main reference line 62 is provided on the rear surface of the opaque main-scanning-direction abutting portion 52 and is not visible from the front side.

Each of the main reference lines 60 and 62 of the reference portion is provided so as to be located in a region outside the peripheral edge 12C of the reading target 12 having a readable document size when the reading target 12 is set at a predetermined position. Note that, in the first exemplary embodiment, the reading area 56 of the reading unit 22 is expanded so as to include portions of the main reference lines 60 and 62.

To describe it specifically, in the case where a maximum readable document size in the image reading device 10 is the size of an A3 sheet, the reading target 12, which is an A3 document, is set at the predetermined position by causing the sides 12A and 12B of the reading target 12 to abut against the edge 52A of the main-scanning-direction abutting portion 52 and the edge 54A of the subscanning-direction abutting portion 54, respectively. In this state, the main reference lines 60 and 62 are located outside the peripheral edge 12C of the reading target 12.

Figure 4:
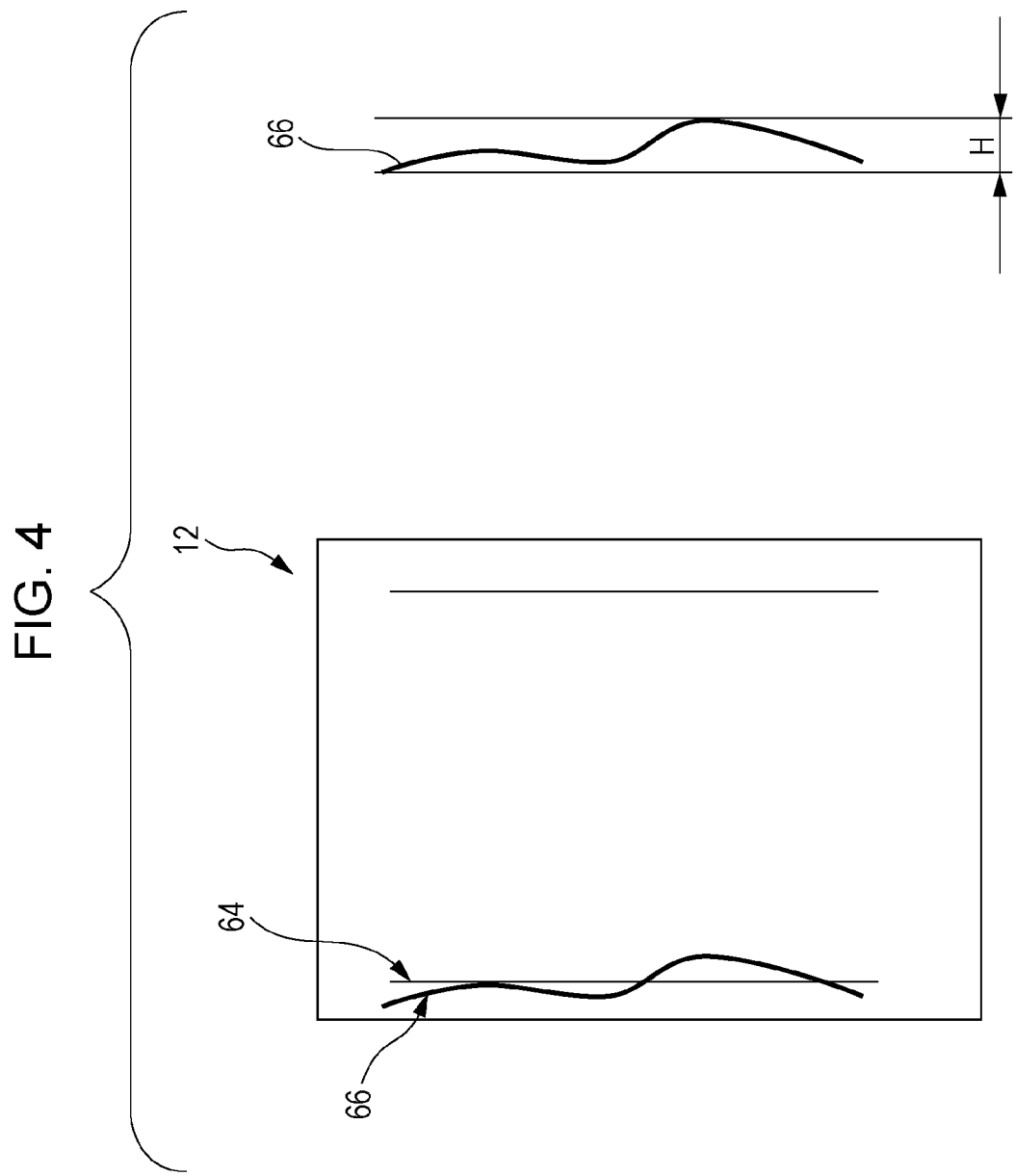
FIG. 4 is a diagram illustrating a straight line to be read has been captured in a distorted state.

FIG. 4 is a diagram illustrating a straight line 64 formed on the reading target 12 and image data 66 of the straight line 64 acquired by the image reading device 10.

Distortion may occur in the image data 66 acquired by the image reading device 10 due to, for example, positional variations and inclination of the carriages 24 and 26 caused by variations in winding amounts of the drive wires 40 or deformation of the housing 14A. As a result, distortion occurs in the image data 66 indicating the straight line 64, and linearity may be determined by using a distortion width H.

Figure 5:
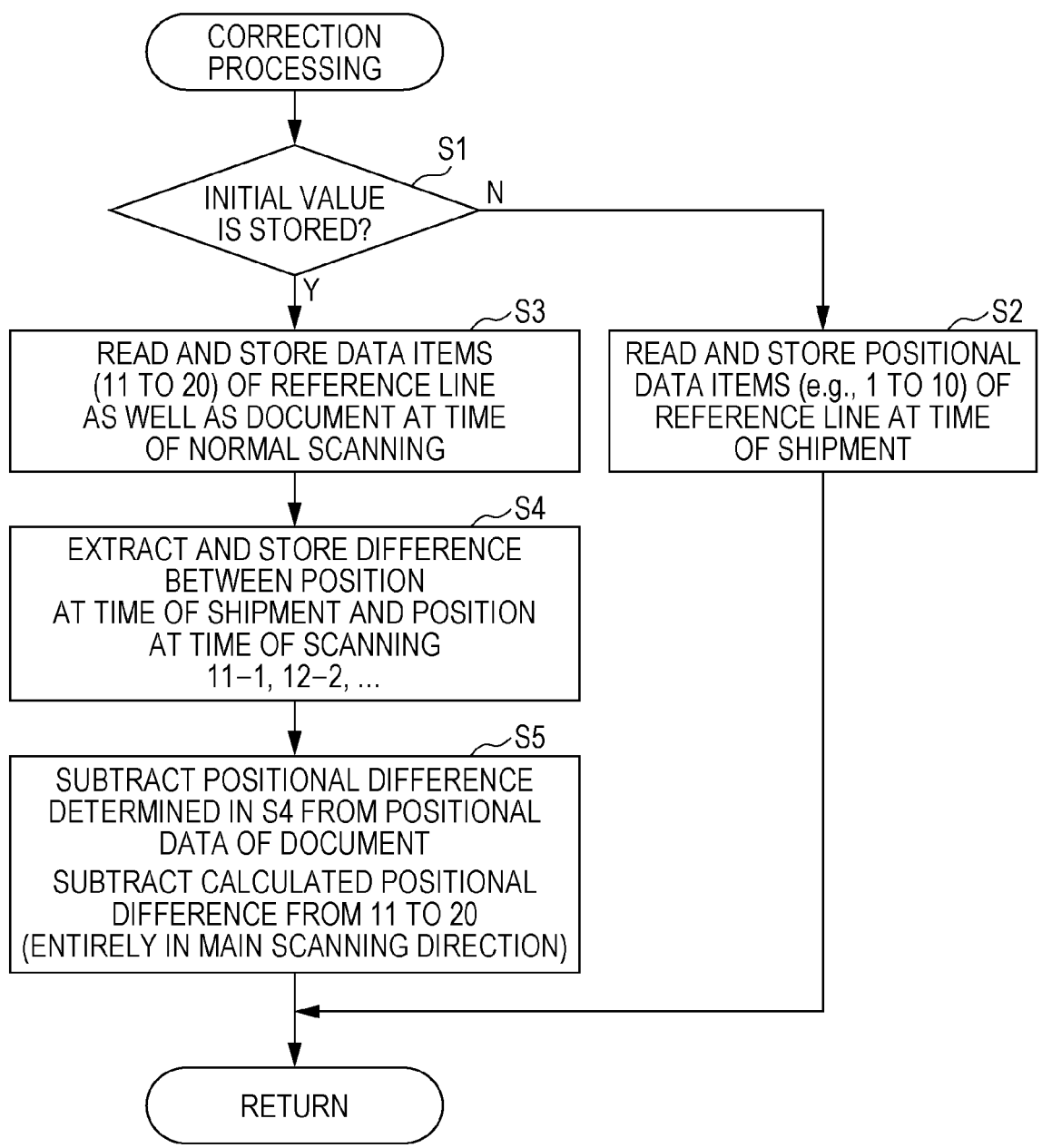
FIG. 5 is a flowchart illustrating an operation of the image reading device according to the first exemplary embodiment.

FIG. 5 is a flowchart illustrating a flow of correction processing that is performed by the image processing unit 50, and the operation of the image reading device 10 will now be described by using the flowchart. Note that, although the image reading device 10 includes the first main reference line 60 and the second main reference line 62 as the reference portion, an operation using only the first main reference line 60 will be described in the first exemplary embodiment.

In other words, the image processing unit 50 includes a calculation unit to which a central processing unit (CPU), read only memory (ROM), and random access memory (RAM) are connected, and the CPU operates in accordance with a program stored in the ROM. For example, upon first energization at the time of shipment, when a reading switch is operated, correction processing is invoked from a main routine.

Then, for example, it is determined whether an initial value, which will be described later, is stored in a flash memory that is a non-volatile semiconductor memory included in the image processing unit 50 (S1). The initial value has not been stored when the initial energization is performed at the time of shipment. Thus, the reading unit 22 is operated so as to read the first main reference line 60, and positional data of the first main reference line 60 is read and stored as the initial value in the flash memory (S2). After that, the processing returns to the main routine.

Figure 6:
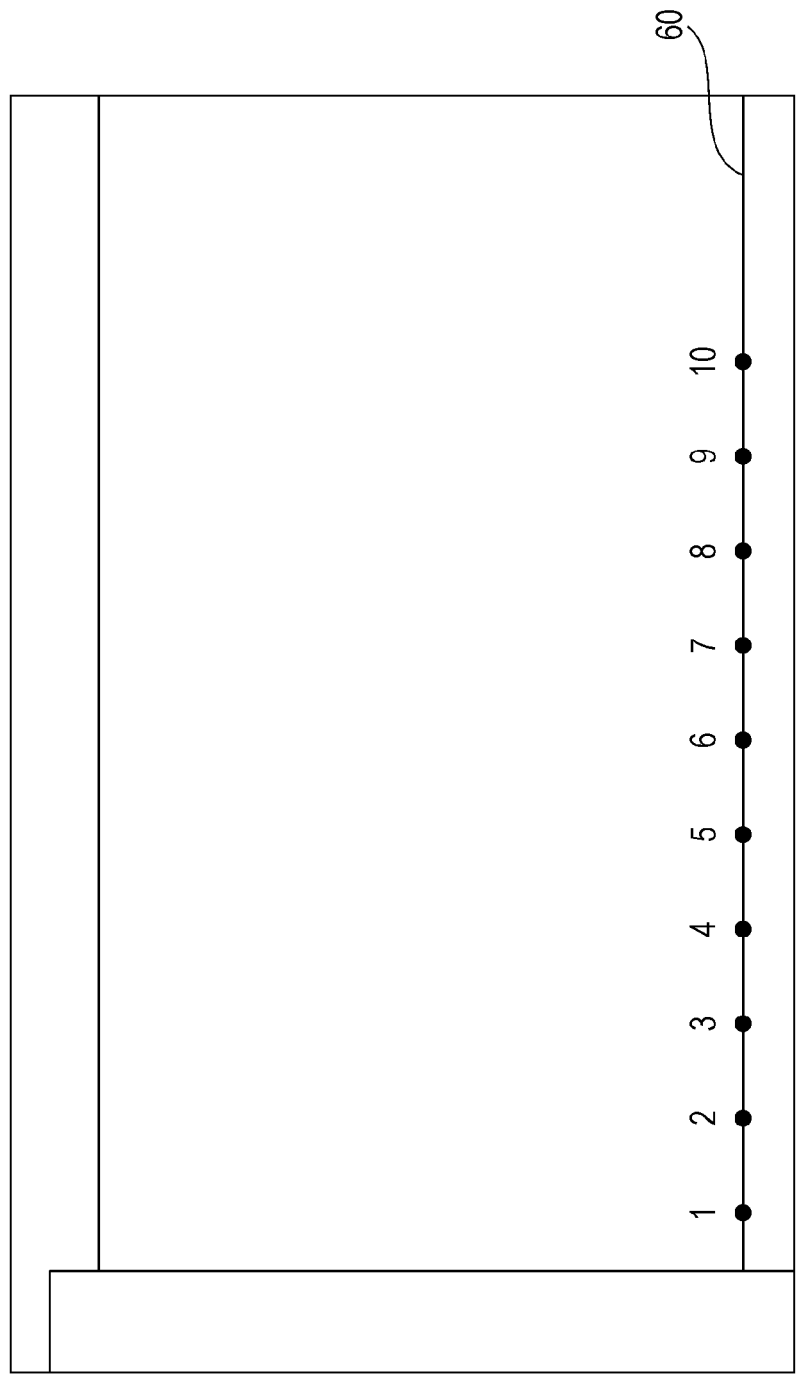
FIG. 6 is a diagram used for describing an operation of the image reading device according to the first exemplary embodiment.

In this case, as illustrated in FIG. 6, the positional data that is stored as the initial value includes, for example, positional data items of measurement points that are set beforehand on the first main reference line 60 so as to be equally spaced, and these positional data items, which are stored as initial values, will be referred to as initial-value data items 1 to 10.

Then, after starting to use the image reading device 10, when the reading switch is operated, and the correction processing is invoked from the main routine, it is determined in step S1 that the initial values are stored in the flash memory (S1). Subsequently, the reading unit 22 reads the positional data items of the measurement points on the first main reference line 60, and these positional data items are stored as comparative data items 11 to 20 in a memory unit such as the RAM as illustrated in FIG. 5 (S3). In addition, an image of the reading target 12 is also read, and this read data is stored in the memory unit such as the RAM.

Note that the comparative data items 11 to 20 do not need to be stored for each normal scan operation. For example, the comparative data items 11 to 20 may be stored when a scan operation is performed after a certain time has passed, or the comparative data items 11 to 20 may be stored when a scan operation has been performed a predetermined number of times.

Next, the initial-value data items 1 to 10 are subtracted from the corresponding comparative data items 11 to 20, and a displacement amount of the positional data item that has been read at the time of a normal scan operation from the corresponding initial value is acquired at each measurement point (S4).

Then, the whole read data acquired by reading the reading target 12 in the main scanning direction SH is corrected on the basis of the acquired displacement amount (S5).

To describe it specifically, the displacement amount acquired at each measurement point of the first main reference line 60 is subtracted from a corresponding one of read data items of a first straight line 68A that is provided on the reading target 12, the one read data item corresponding to the measurement point in the main scanning direction SH, so that correction data items are acquired. This arithmetic operation is performed on read data items of a second straight line 68B and read data items of a third straight line 68C, so that correction data items are acquired (generated), and as a result, a corrected image is obtained.

Figure 7:
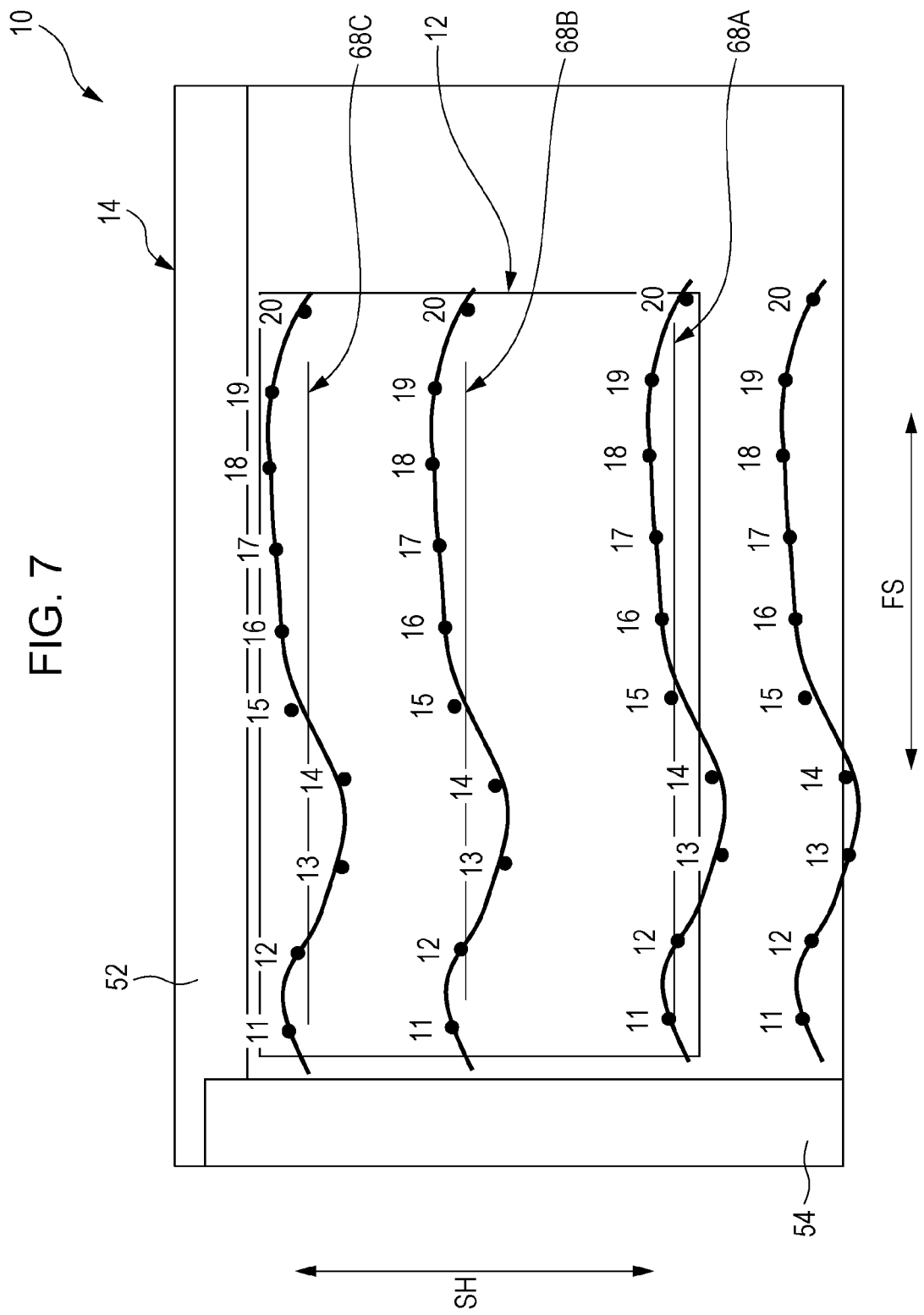
FIG. 7 is a diagram used for describing an operation that is performed subsequently to the operation illustrated in FIG. 6.

In FIG. 7, each of the straight lines 68A to 68C of the reading target 12 extends along the first main reference line 60, and thus, positional data items obtained by moving the comparative data items 11 to 20 to the positions of the straight lines 68A to 68C in the main scanning direction SH are acquired as correction data items.

Note that values between the adjacent initial-value data items (1 and 2, 2 and 3, . . . ) for acquiring displacement amounts are obtained by, for example, interpolation, and the read data items are complemented by using these acquired data items.

(Comparative Test)

Figure 8:
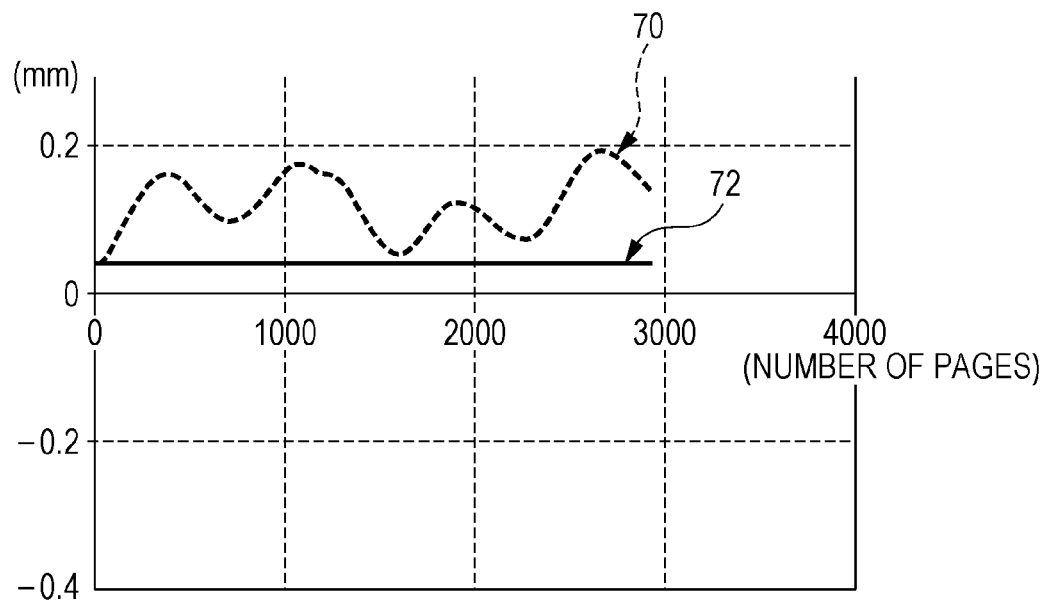
FIG. 8 is a graph illustrating results of a longitudinal linearity test using the image reading device according to the first exemplary embodiment.

FIG. 8 is a graph illustrating a result of a longitudinal linearity test in which the reading target 12 that has a straight line extending in the subscanning direction FH is read by the image reading device 10 according to a comparative example 70 that does not perform the above-described correction processing and a result of a longitudinal linearity test in which the reading target 12 that has a straight line extending in the subscanning direction FH is read by the image reading device 10 according to the exemplary embodiment 72. In FIG. 8, the horizontal axis denotes the number of documents that have been read, and the vertical axis denotes a distortion width.

In FIG. 8, although the distortion width of the comparative example 70 markedly changes depending on the number of documents that have been read, no change in the distortion width of the exemplary embodiment 72 corresponding to the number of documents that have been read is observed.

Figure 9:
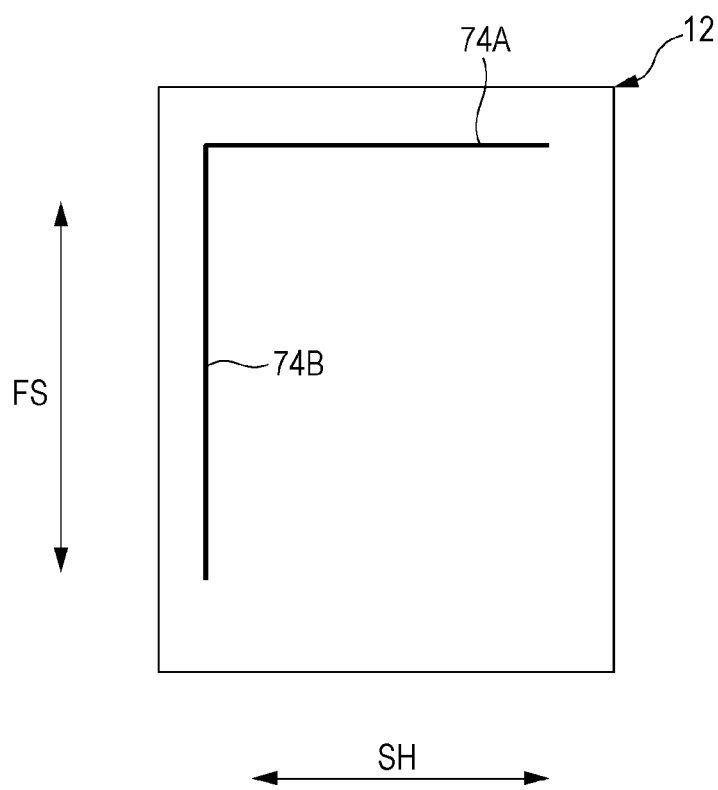
FIG. 9 is a diagram illustrating a reading target that is used in a right-angle test using the image reading device according to the first exemplary embodiment.

FIG. 9 is a diagram illustrating the reading target 12 that is used in a right-angle test using the image reading device 10, and a straight line 74A extending in the main scanning direction SH and a straight line 74B extending in the subscanning direction FH are provided on the reading target 12 so as to intersect each other at right angles.

Figure 10:
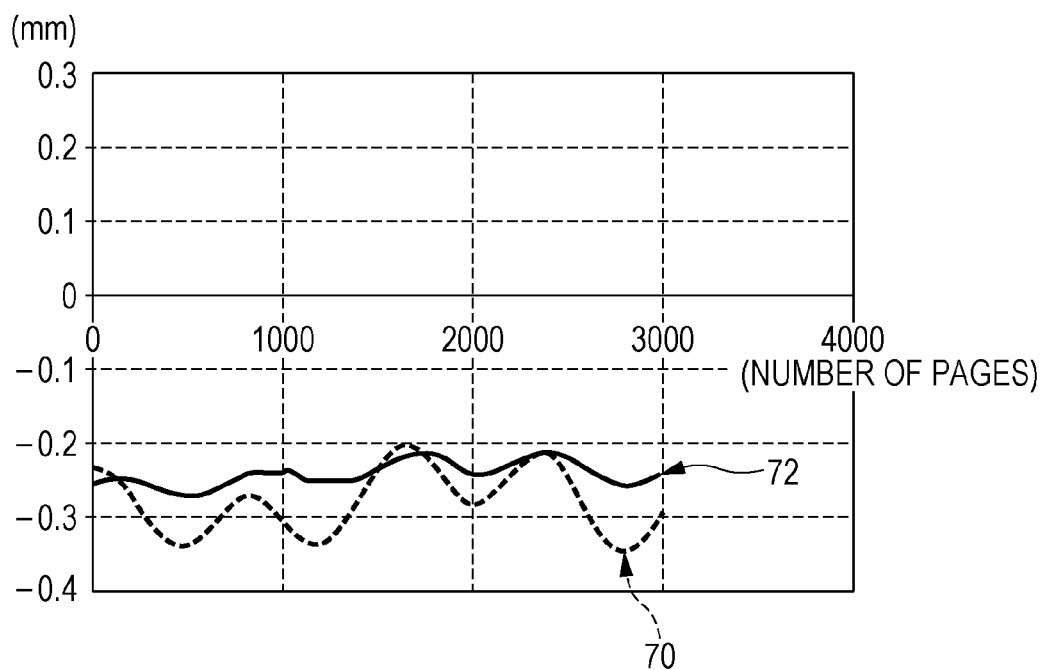
FIG. 10 is a graph illustrating results of the right-angle test using the image reading device according to the first exemplary embodiment.

FIG. 10 is a graph illustrating a result of a right-angle test in which the reading target 12 illustrated in FIG. 9 is read by the image reading device 10 according to the comparative example 70 that does not perform the above-described correction processing and a result of a right-angle test in which the reading target 12 illustrated in FIG. 9 is read by the image reading device 10 according to the exemplary embodiment 72. In FIG. 10, the horizontal axis denotes the number of documents that have been read, and the vertical axis denotes a distortion width.

It is understood from FIG. 10 that, although the distortion width of the comparative example 70 markedly changes depending on the number of documents that have been read, there is a small change in the distortion width of the exemplary embodiment 72 corresponding to the number of documents that have been read.

Figure 11:
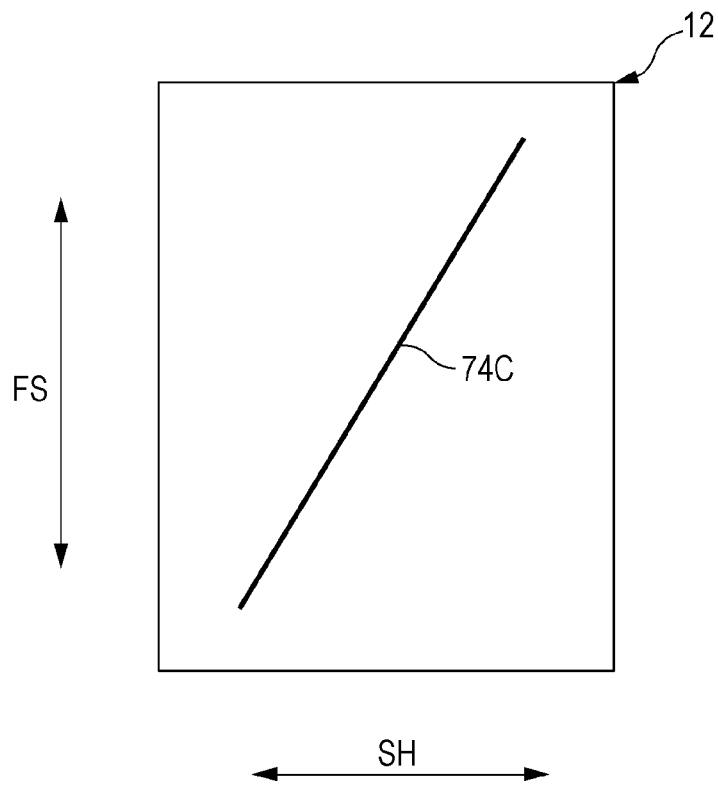
FIG. 11 is a diagram illustrating a reading target that is used in an oblique linearity test using the image reading device according to the first exemplary embodiment.

FIG. 11 is a diagram illustrating the reading target 12 that is used in an oblique linearity test using the image reading device 10, and a straight line 74C extending in a direction that is inclined with respect to the main scanning direction SH and with respect to the subscanning direction FH is provided on the reading target 12.

Figure 12:
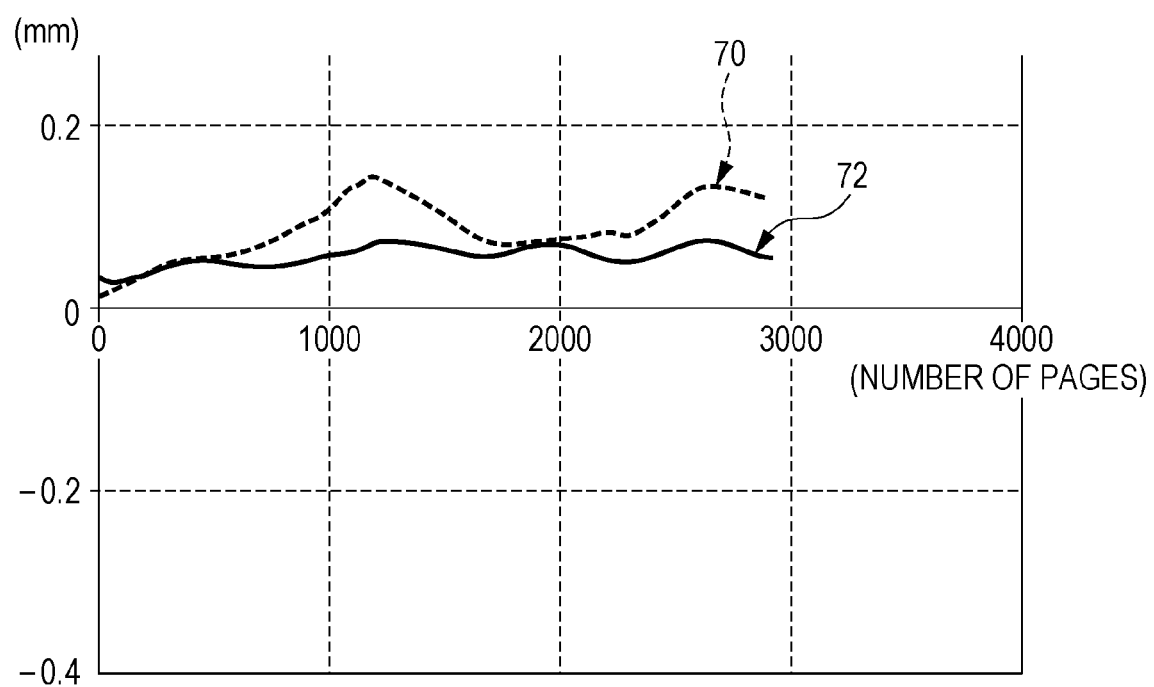
FIG. 12 is a graph illustrating results of the oblique linearity test using the image reading device according to the first exemplary embodiment.

FIG. 12 is a graph illustrating a result of an oblique linearity test in which the reading target 12 illustrated in FIG. 11 is read by the image reading device 10 according to the comparative example 70 that does not perform the above-described correction processing and a result of an oblique linearity test in which the reading target 12 illustrated in FIG. 11 is read by the image reading device 10 according to the exemplary embodiment 72. In FIG. 12, the horizontal axis denotes the number of documents that have been read, and the vertical axis denotes a distortion width.

It is understood from FIG. 12 that, although the distortion width of the comparative example 70 markedly changes depending on the number of documents that have been read, there is a small change in the distortion width of the exemplary embodiment 72 corresponding to the number of documents that have been read.

Note that, in the present exemplary embodiment, although a case has been described in which read data is corrected on the basis of an acquired displacement amount, the present disclosure is not limited to this case.

For example, error handling may be performed (error handling unit) when an acquired displacement amount exceeds a predetermined value. Here, for example, the predetermined value is set within a range of ±0.3 mm. In addition, a displacement amount that is compared with the predetermined value may be the average value of displacement amounts acquired at the measurement points or may be the greatest value among these displacement amounts. In the present exemplary embodiment, the displacement amount that is compared with the predetermined value is the greatest value among displacement amounts acquired at the measurement points.

Examples of the error handling include activating an alarm and displaying a message that indicates a need for repair onto a user interface (UI).

Figure 13:
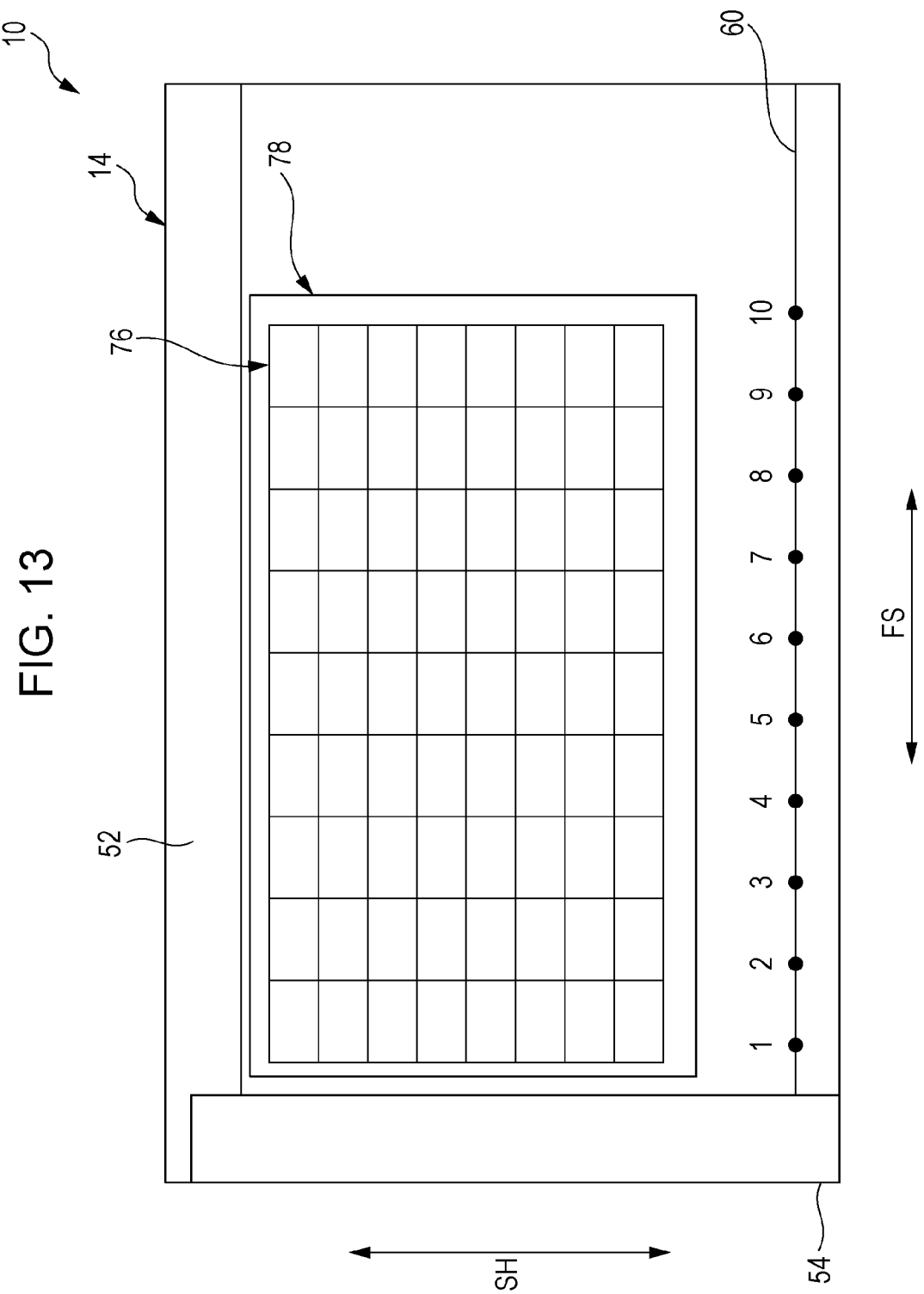
FIG. 13 is a diagram illustrating a grid sample that is used in an application.

In this case, at the time of shipment, a grid sample 78 that has a grid line 76 having a known absolute value as illustrated in FIG. 13 is read beforehand, and the positional data of the grid line 76 is stored as grid data into the flash memory. In this case, in the above-described error handling, the grid data is corrected on the basis of an acquired displacement amount, so that the absolute value of read data may be corrected on the basis of the corrected grid data.

In addition, in the present exemplary embodiment, although the first main reference line 60, which is a reference line, is provided on the glass surface 18A on which the reading target 12 is to be placed, the present disclosure is not limited to this configuration.

For example, the reference line may be provided on the covering 16, which is configured to be located above the reading target 12. In this case, the quality of appearance may be further improved compared with the case where the reference line is provided on the glass surface 18A on which the reading target 12 is to be placed.

In addition, if a reference line having a grid-like pattern is provided on the covering 16, read data may be corrected on the basis of the reference line that appears at the outer periphery of the reading target 12 in a state where the reading target 12 is covered with the covering 16. As a result, the accuracy of correction data is improved even in the case where the reading target 12 has a small size.

Second Exemplary Embodiment

Figure 14:
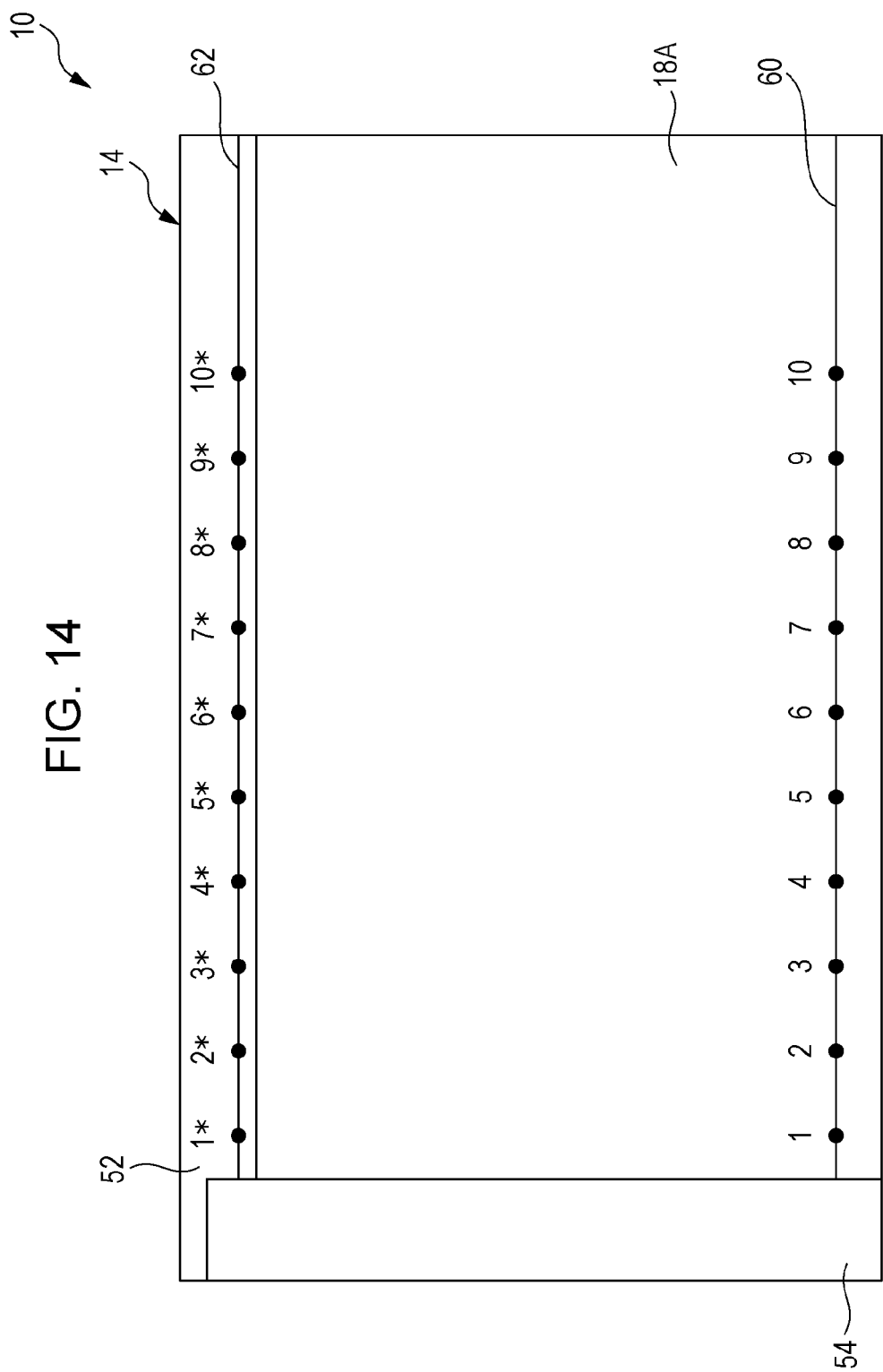
FIG. 14 is a diagram illustrating a top surface of an image reading device according to a second exemplary embodiment.
Figure 16:
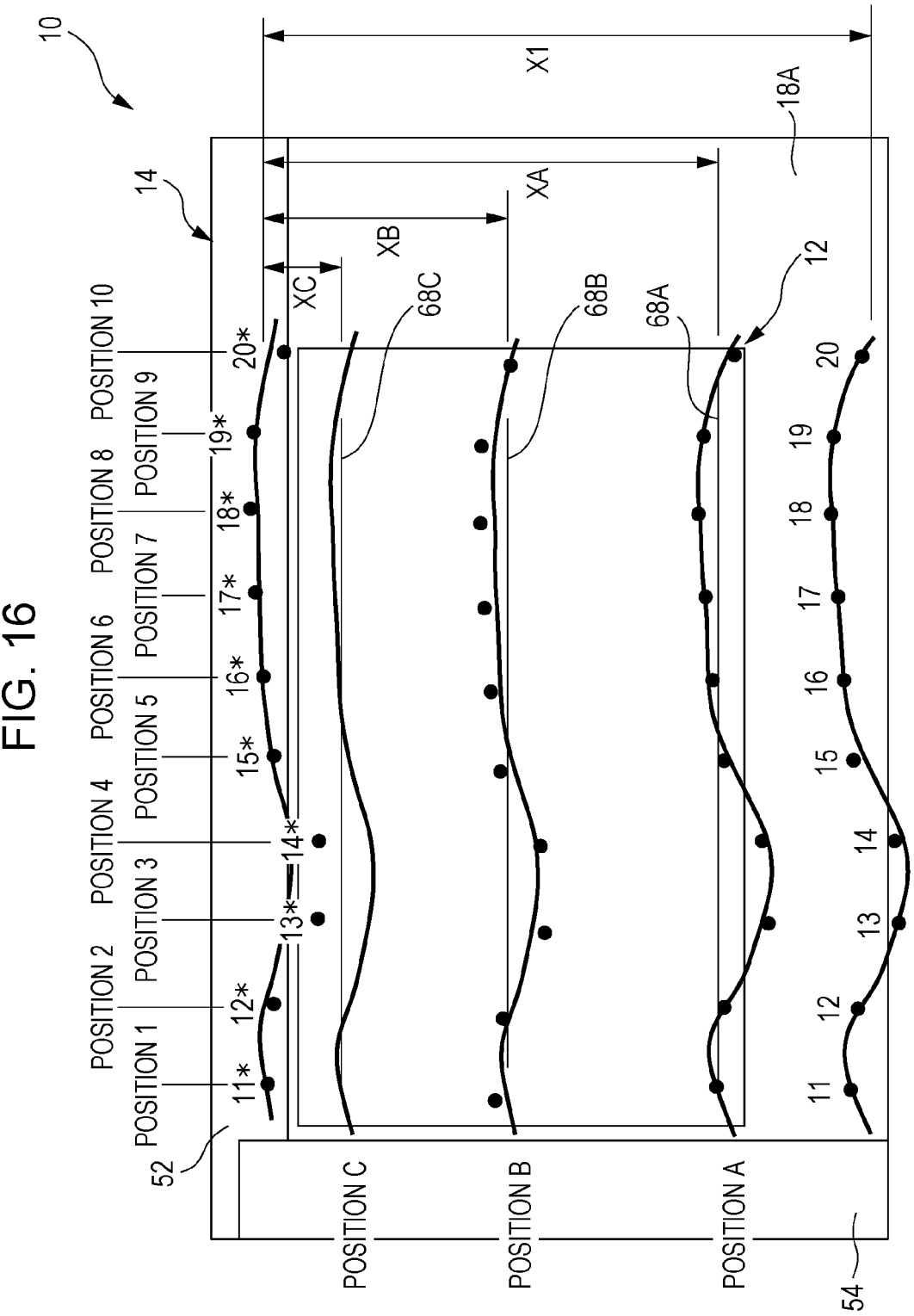
FIG. 16 is a diagram used for describing an operation of the image reading device according to the second exemplary embodiment.

FIG. 14 to FIG. 16 are diagrams illustrating a second exemplary embodiment. Components that are the same as or similar to the components according to the first exemplary embodiment are denoted by the same reference signs, and descriptions thereof will be omitted. Only differences from the first exemplary embodiment will be described.

In the image reading device 10, read data that is read from the reading target 12 is corrected by using the first main reference line 60, which is included in the reference portion, and the second main reference line 62, which is included in the reference portion and which is parallel to the first main reference line 60.

To describe it specifically, in step S2 of the first exemplary embodiment, which is illustrated in FIG. 5, the first main reference line 60 and the second main reference line 62 are read, and positional data items of the main reference lines 60 and 62 are stored as initial values into the flash memory (S2).

In this case, as illustrated in FIG. 14, the positional data items that are stored as the initial values include, for example, positional data items of the measurement points that are set beforehand on the first main reference line 60 so as to be equally spaced, and these positional data items, which are stored as the initial values, will be referred to as the initial-value data items 1 to 10.

In addition, the positional data items that are stored as the initial values include positional data items of measurement points that are set beforehand on the second main reference line 62 so as to be equally spaced, and these positional data items, which are stored as the initial values, will be referred to as initial-value data items 1* to 10*.

Then, in step S3 of the first exemplary embodiment, which is illustrated in FIG. 5, the positional data items of the measurement points of the main reference lines 60 and 62 are read, and these positional data items are stored as comparative data items 11 to 20 and 11* to 20* in a memory unit such as the RAM as illustrated in FIG. 16 (S3). In addition, an image of the reading target 12 is also read, and read data items are stored in the memory unit such as the RAM.

Next, in step S4 of the first exemplary embodiment, which is illustrated in FIG. 5, the initial-value data items 1 to 10 are subtracted from the corresponding comparative data items 11 to 20, and a displacement amount of the positional data item that has been read at the time of a normal scan operation from the corresponding initial value is acquired at each measurement point.

In addition, the initial-value data items 1* to 10* are subtracted from the corresponding comparative data items 11* to 20*, and a displacement amount of the positional data item that has been read at the time of a normal scan operation from the corresponding initial value is acquired at each measurement point (S4).

Then, the read data items that have been read between the first main reference line 60 and the second main reference line 62 are corrected on the basis of the displacement amounts. In this case, the read data items are corrected by using complemented displacement amounts that have been complemented on the basis of the relationship between a separation distance X1 from the first main reference line 60 to the second main reference line 62 and the distances (XA, XB, XC, etc.) from the second main reference line 62 to the read data items to be corrected.

More specifically, a case where read data of a position 1 of the first straight line 68A that is provided at a position A as illustrated in FIG. 16 is complemented will now be described with reference to FIG. 15.

A complemented displacement amount HZ is obtained by multiplying a subtraction value G, which is obtained by subtracting a displacement amount (e.g., 11−1) on the first main reference line 60 from a displacement amount (e.g., 11*−1*) on the second main reference line 62, by a division value, which is obtained by dividing the distance XA between the second main reference line 62 and the first straight line 68A by the separation distance X1 between the first main reference line 60 and the second main reference line 62.

complemented displacement amount $HZ=\{(11^*-1^*)-(11-1)\}\times XA/X1$

Then, the complemented displacement amount is subtracted from the displacement amount (11*−1*) on the second main reference line 62, and the read data item of the first straight line 68A at the position A is corrected.

$(11^*-1^*)-\{(11^*-1^*)-(11-1)\}\times XA/X1$

This arithmetic operation is repeated for positions 1 to 10 of the first straight line 68A, and the read data items of the first straight line 68A at the positions 1 to 10 are corrected.

Note that read data items between the adjacent read data items (11* and 12*, 12* and 13*, ..., 11 and 12, 12 and 13, ...) are corrected by using data items acquired by, for example, interpolation.

Then, these arithmetic operations are performed on read data of the second straight line 68B that is provided at a position B and read data of the third straight line 68C that is provided at a position C.

The read data items that have been read between the first main reference line 60 and the second main reference line 62 are corrected on the basis of displacement amounts. In this case, the read data items are corrected by using complemented displacement amounts that have been complemented on the basis of the relationship between the separation distance X1 from the first main reference line 60 to the second main reference line 62 and the distances (XA, XB, XC, etc.) from the second main reference line 62 to the read data items to be corrected.

Third Exemplary Embodiment

FIG. 17 is a diagram illustrating a third exemplary embodiment. Components that are the same as or similar to the components according to the above-described exemplary embodiments are denoted by the same reference signs, and descriptions thereof will be omitted. Only differences from the above-described exemplary embodiments will be described.

In the third exemplary embodiment, the first main reference line 60 and the second main reference line 62, which are included in the reference portion, are provided at positions different from those in the first exemplary embodiment.

In other words, an opaque non-reading unit 80 that has a rectangular frame-like shape is formed along the periphery of the top surface of the image reading processing unit 14. A portion of the non-reading unit 80 that is located on the first side THI in the transverse direction of the image reading processing unit 14 includes the main-scanning-direction abutting portion 52, and a portion of the non-reading unit 80 that is located on the second side NHT in the longitudinal direction of the image reading processing unit 14 includes the subscanning-direction abutting portion 54.

A frame edge of the non-reading unit 80 on the first side THI in the transverse direction is formed of the edge 52A of the main-scanning-direction abutting portion 52, and the second main reference line 62, which is to be read by the reading unit 22, is formed of the edge 52A. In addition, a frame edge of the non-reading unit 80 on the second side THT in the transverse direction forms the first main reference line 60, which is to be read by the reading unit 22.

The main reference lines 60 and 62, which are to be read by the reading unit 22, are formed of the frame edges of the non-reading unit 80, and the second main reference line 62 is formed of the edge 52A of the main-scanning-direction abutting portion 52, against which the reading target 12 is caused to abut so as to be positioned. It is desirable that the non-reading unit 80 be black in order to enhance the distinction between the non-reading unit 80 and a document, which is the reading target 12.

Note that, in the present exemplary embodiment, although the main reference lines 60 and 62 are formed by using the frame edges of the non-reading unit 80, the present disclosure is not limited to this configuration. For example, the main reference lines 60 and 62 may be formed by using the edges of the platen glass 18.

Fourth Exemplary Embodiment

FIG. 18 is a diagram illustrating a fourth exemplary embodiment. Components that are the same as or similar to the components according to the above-described exemplary embodiments are denoted by the same reference signs, and descriptions thereof will be omitted. Only differences from the above-described exemplary embodiments will be described.

A first auxiliary reference line 82 and a second auxiliary reference line 84 each extending in a direction crossing the direction in which the main reference lines 60 and 62 extend are provided in the reading area 56 of the reading unit 22 of the image reading device 10. The auxiliary reference lines 82 and 84 extend in the main scanning direction SH, in which the full-rate carriage 24 included in the reading unit 22 extends. The auxiliary reference lines 82 and 84 are each formed of a straight line, and the auxiliary reference lines 82 and 84 are parallel to each other. Here, the term "parallel" includes inclinations within a manufacturing error range.

The first auxiliary reference line 82 is provided on the glass surface 18A of the platen glass 18, on which the reading target 12 is to be placed. The first auxiliary reference line 82 may be formed by, for example, printing, and as an example, the first auxiliary reference line 82 is provided on the rear surface of the platen glass 18 that forms a portion of the platen glass 18 on the side of the reading unit 22.

The second auxiliary reference line 84 is provided on the rear surface of the subscanning-direction abutting portion 54 against which a document, which is the reading target 12, is caused to abut so as to be positioned, the rear surface being located on the side of the reading unit 22, and the second auxiliary reference line 84 may be formed by, for example, printing.

Note that, although FIG. 18 illustrates a case in which the second auxiliary reference line 84 is provided on the front surface of the subscanning-direction abutting portion 54 for convenience of describing the position of the second auxiliary reference line 84, the second auxiliary reference line 84 is provided on the rear surface of the opaque subscanning-direction abutting portion 54 and is not visible from the front side.

The read data items that have been read between the first auxiliary reference line 82 and the second auxiliary reference line 84 are corrected on the basis of displacement amounts. In this case, the read data items are corrected by using complemented displacement amounts that have been complemented on the basis of the relationship between the separation distance from the first auxiliary reference line 82 to the second auxiliary reference line 84 and the distance from the first auxiliary reference line 82 or the second auxiliary reference line 84 to the read data to be corrected.

Note that, in the present exemplary embodiment, although a case has been described in which displacement amounts are obtained on the basis of the main reference lines 60 and 62 and the auxiliary reference lines 82 and 84, the present disclosure is not limited to this case. For example, displacement amounts may be obtained on the basis of the auxiliary reference lines 82 and 84.

In addition, a CIS-type scanner may be used in the present technology.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading device comprising:
at least one reference portion that comprises a reference line and is provided in a reading area of a reading unit that comprises an image sensor and includes a moving mechanism;
a memory that stores, as an initial value, positional data of the reference portion that is read by the reading unit; and
a processor, configured to:
read the positional data of the reference portion and acquires a displacement amount of the read positional data from the initial value; and
correct, based on the displacement amount, read data obtained by reading a reading target,
wherein the reference portion includes a first reference portion that is provided on a first side of a scanning direction of the reading unit and a second reference portion that is provided on a second side of the scanning direction of the reading unit, and
wherein, when the processor corrects the read data, which has been read between the first reference portion and the second reference portion, based on the displacement amount, the processor corrects the read data by using a complemented displacement amount complemented based on a relationship between a separation distance from the first reference portion to the second reference portion and a distance from the first reference portion or the second reference portion to the read data to be corrected.

2. The image reading device according to claim 1, wherein the at least one reference portion includes a plurality of reference portions.

3. The image reading device according to claim 2, wherein the plurality of reference portions are parallel to each other.

4. The image reading device according to claim 1, wherein the reference portion includes an edge of an abutting portion against which the reading target is caused to abut so as to be positioned.

5. The image reading device according to claim 1, wherein the reference line is provided in such a manner as to be located in a region outside an edge of the reading target having a readable document size in a state where the reading target is set at a predetermined position.

6. The image reading device according to claim 1, wherein the reference line is provided on a glass surface on which the reading target is to be placed.

7. The image reading device according to claim 1, wherein the reference line is provided on a covering that is to be placed above the reading target.

8. The image reading device according to claim 1, wherein the reference line includes a main reference line extending in a direction of movement of the moving mechanism and an auxiliary reference line extending in a direction crossing the direction in which the main reference line extends.

9. The image reading device according to claim 1, wherein the reference line is provided on a rear surface of an abutting portion against which the reading target is caused to abut so as to be positioned.

* * * * *